United States Patent Office 3,166,401
Patented Jan. 19, 1965

3,166,401
CONTROLLING VEGETATION WITH ARYLOXYETHYL ESTERS OF DIALLYLTHIOCARBAMIC ACIDS
Anton G. Weiss, Nitro, W. Va., and Philip C. Hamm, Webster Groves, Mo., assignors to Monsanto Company, a corporation of Delaware
No Drawing. Original application Oct. 7, 1959, Ser. No. 844,872. Divided and this application Sept. 26, 1962, Ser. No. 253,235
5 Claims. (Cl. 71—2.6)

The present invention relates to new compounds and more particularly to aryloxyethyl esters of diallylthiocarbamic acids.

The present application is a division of copending application Serial No. 844,872, filed October 7, 1959.

The compounds of the present invention may be represented by the general formula

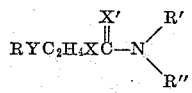

where R represents phenyl or halogen substituted phenyl, Y represents oxygen or sulfur, X and X' represent oxygen or sulfur at least one of which is sulfur and R' and R'' represent allyl or chloroallyl. Typical examples of the preferred compounds comprise 2-(phenylthio)ethyl, 2-(phenoxy)ethyl, 2-(p-chlorophenylthio)ethyl, 2-(p-chlorophenoxy)ethyl, 2-(p-bromophenylthio)ethyl, 2-(p-bromo-phenoxy)ethyl, 2-(2,4-dichlorophenylthio)ethyl, 2-(2,4-dibromophenylthio)ethyl, 2-(2,4-dichlorophenoxy)ethyl, 2-(2,4-dibromophenoxy)ethyl, 2-(2,4,5-trichlorophenylthio)ethyl and 2 - (2,4,5-trichlorophenoxy)ethyl esters of diallyldithiocarbamic acid, diallylthiolcarbamic acid and diallylthionocarbamic acid.

Although other methods of preparation are suitable, such thiocarbamates may be conveniently obtained by converting diallylamine to a thiocarbamic acid and condensing the diallylthiocarbamic acid with the halide containing the desired ether substituent. As an illustration of a satisfactory procedure, 23 grams (0.3 mole) of carbon bisulfide was added dropwise with stirring to 68 grams (0.7 mole) of diallylamine dissolved in 150 ml. of dimethyl formamide, the mixture being kept at 20–25° C. during the addition. Then 56 grams (0.3 mole) of p-chlorophenoxy-ethyl chloride was added in one portion and the mixture stirred for 5 hours at 60–70° C. After cooling to room temperature, 250 ml. of water were added to the product and the water solution extracted with 250 ml. of ether. The organic layer which separated was washed with 300 ml. of water and dried over sodium sulfate. The solvent was removed by stripping at 90–100° C. (14 mm. pressure). The 2-(p-chlorophenoxy)ethyl diallyldithiocarbamate, obtained in theory yield, was an amber oil analyzing 4.6% nitrogen, 10.9% chlorine and 19.8 sulfur as compared to 4.3% nitrogen, 10.8% chlorine and 19.6% sulfur calculated for $C_{15}H_{18}ClNOS_2$.

The new compounds exert significant biological activity. In general they are efficient herbicides which combine grass and broadleaf activity. They are particularly effective in preemergent application. Amounts within the range of 1 to 60 pounds per acre are adequate for most purposes. The toxicants may be applied in the form of a spray containing the active ingredient in a concentration within the range of 0.05–5.0%. While the active components are insoluble in water they are soluble in common organic solvents. They may be dispersed directly in water or dissolved first in an organic solvent and then dispersed. As dispersing and wetting agents there may be employed soft or hard sodium or potassium soaps, alkylated aromatic sodium sulfonates such as sodium dodecylbenzenesulfonate, or an amine salt thereof, alkali metal salts of sulfated fatty alcohols, ethylene oxide condensation products of alkyl phenols, tall oil, higher alcohols or higher mercaptans. The solid formulations or dusts may contain in addition to the active ingredient, diluents or extenders, preferably those which render the formulations permanently dry and free flowing. Effective solid diluents are clay, talc, pyrophyllite, silica and fuller's earth.

As illustrative of the herbicidal activity the ester was emulsified in water and the emulsion applied as a spray. In this manner the active ingredient was applied to the soil of seeded plots before any plants emerged. About fourteen days after application of the toxicants results were observed and recorded. The number of seeds emerging was converted to weighted herbicidal ratings based on average percent germination of any particular seed lot times an injury factor. This evens irregularities of ratings on seeds which may vary in percent germination. The injury factor takes into consideration any plants not expected to survive. Thus, phytotoxicity ratings are based on the number of plants which emerge and will survive as observed two weeks after planting. Herbicidal ratings were assigned by means of the following conversion scale:

| Percent emergence: | Phytotoxicity rating |
|---|---|
| 0–25 | 3 or severe. |
| 26–50 | 2 or moderate. |
| 51–75 | 1 or slight. |
| 76–100 | 0 or none. |

Table I

| Active Ingredient | Lbs./Acre | Results Observed |
|---|---|---|
| 2-(Phenoxy) ethyl diallylthiolcarbamate. | 25 | Severe phytotoxicity to a mixture of grasses, wild oat, rye grass, sugar beet, foxtail, crab grass, pigweed and sorghum; moderate phytotoxicity to brome grass. |
| 2-(Phenylthio) ethyl diallylthiolcarbamate. | 25 | Severe phytotoxicity to sugar beet and crab grass; moderate phytotoxicity to wild oats. |
| 2-(2,4,5-Trichlorophenoxy)-ethyl diallylthiolcarbamate. | 5 | Severe phytotoxicity to morning glory, radish and pigweed; moderate phytotoxicity to a mixture of broadleaved plants, sugar beet and crab grass. |
| 2-(2,4-Dichlorophenoxy) ethyl diallylthiolcarbamate. | 5 | Severe phytotoxicity to wild oats, rye grass, radish, sugar beet, crab grass and wild buckwheat; moderate phytotoxicity to a mixture of grasses, a mixture of broadleaved plants, brome grass and pigweed. |
| 2-(p-Chlorophenoxy) ethyl diallylthiolcarbamate. | 25 | Severe phytotoxicity to a mixture of grasses, wild oats, brome grass, rye grass, foxtail, crab grass and sorghum; moderate phytotoxicity to radish and sugar beet. |
| 2-(p-Bromophenoxy) ethyl diallylthiolcarbamate. | 25 | Severe phytotoxicity to a mixture of grasses, a mixture of broadleaved plants, morning glory, wild oat, radish, sugar beet, crab grass, pigweed and soybean moderate phytotoxicity to brome grass, rye grass, foxtail, wild buckwheat and tomato. |
| 2-(2,4,6-Trichlorophenoxy)-ethyl diallylthiolcarbamate. | 25 | Severe phytotoxicity to a mixture of broadleaved plants, radish, sugar beet, crab grass, pigweed, wild buckwheat and tomato; moderate phytotoxicity to morning glory, rye grass and soybean. |

When tested at lower concentrations, 2-(phenoxy)ethyl diallylthiolcarbamate completely controlled crab grass at one pound per acre and was still very active on wild oats and brome grass.

Useful properties as contact herbicides are illustrated by applying the compounds in spray form to 21 day old specimens of a mixture of grasses and a mixture of broadleaved plants and observing the phytotoxicity. Typical results are recorded in Table II. The mixture of grasses is indicated as "Grass" and the mixture of broadleaved plants is indicated as "Broadleaf" in the table. A spray containing 0.5% of the active ingredient shown was applied:

Table II

| Active Ingredient | Phytotoxicity Rating | |
| --- | --- | --- |
| | Grass | Broadleaf |
| 2-(2,4-Dichlorophenoxy)ethyl diallylthiolcarbamate | 2 | 3 |
| 2-(p-Chlorophenylthio)ethyl diallylthiolcarbamate | 2 | 2 |
| 2-(p-Bromophenoxy)ethyl diallylthiolcarbamate | 2 | 2 |

Table III further illustrates the pre-emergent herbicidal activity of typical compounds. The active ingredient was applied at a dosage of 25 pounds per acre to the soil of seeded plots before the grass or other plants emerged:

Table III

| Active Ingredient | Results Observed |
| --- | --- |
| 2-(p-Chlorophenoxy)ethyl diallyl-dithiocarbamate. | Severe phytotoxicity to radish and crab grass; moderate phytotoxicity to morning glory, sugar beet, foxtail, wild buckwheat, tomato and sorghum. |
| 2-(2,4-Dichlorophenoxy) ethyl diallyldithiocarbamate. | Severe phytotoxicity to morning glory, radish, sugar beet, foxtail, crab grass, pigweed, soybean and sorghum; moderate phytotoxicity to brome grass and tomato. |
| 2-(2,4,5-Trichlorophenoxy)-ethyl diallyldithiocarbamate. | Severe phytotoxicity to morning glory, radish, sugar beet, pigweed, tomato and sorghum; moderate phytotoxicity to wild oat, brome grass, foxtail, crab grass and wild buckwheat. |
| 2-(Phenoxy)ethyl diallyldithiocarbamate. | Severe phytotoxicity to wild oat and crab grass; moderate phytotoxicity to brome grass, sugar beet, soybean and tomato. |

Table IV illustrates pre-emergent herbicidal activity of typical compounds at 5 pounds per acre:

Table IV

| Active Ingredient | Results Observed |
| --- | --- |
| 2-(2,4,5-Trichlorophenoxy)-ethyl diallylthionocarbamate. | Severe phytotoxicity to morning glory, radish, sugar beet, crab grass, pigweed, wild buckwheat, tomato and soybean; moderate phytotoxicity to rye grass and sorghum. |
| 2-(2,4-Dichlorophenoxy)ethyl diallylthionocarbamate. | Severe phytotoxicity to morning glory, radish, sugar beet, crab grass, pigweed, wild buckwheat, tomato, sorghum and soybean; moderate phytotoxicity to bromecheat grass. |
| 2-(2,4-Dichlorophenoxy)ethyl bis(2-chloroallyl)dithiocarbamate. | Moderate phytotoxicity to morning glory, radish, wild buckwheat and tomato. |

It is intended to cover all changes and modifications of the examples of the invention herein chosen for purposes of disclosure which do not constitute departures from the spirit and scope of the invention.

What is claimed is:

1. The method of controlling vegetation which comprises applying thereto a phytotoxic concentration of a phytotoxic thiocarbamate of the structure

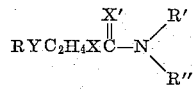

where R represents a member of the group consisting of phenyl and halogen substituted phenyl containing at least one, but not more than three, halogen atoms selected from the group consisting of chlorine and bromine, Y, X and X' represent a member of the group consisting of oxygen and sulfur at least one of X and X' being sulfur and R' and R'' represent radicals selected from the group consisting of allyl monochloro substituted allyl.

2. The method of controlling vegetation which comprises applying thereto a phytotoxic concentration of a phytotoxic thiocarbamate of the structure

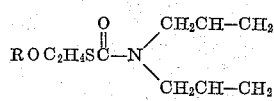

where R represents a middle halogen substituted phenyl radical containing at least one but less than four middle halogen atoms.

3. The method of controlling vegetation which comprises applying thereto a phytotoxic concentration of 2-(phenoxy)ethyl diallylthiolcarbamate.

4. The method of controlling vegetation which comprises applying thereto a phytotoxic concentration of 2-(phenoxy)ethyl diallyldithiocarbamate.

5. The method of controlling vegetation which comprises applying thereto a phytotoxic concentration of a phytotoxic thiocarbamate of the structure

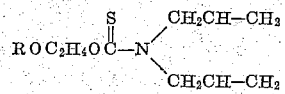

where R represents a middle halogen substituted phenyl radical containing at least one but less than four middle halogen atoms.

References Cited in the file of this patent

UNITED STATES PATENTS

| 2,941,879 | Goodhue | June 21, 1960 |
| 2,992,091 | Harman et al. | July 11, 1961 |
| 3,055,751 | Tilles et al. | Sept. 25, 1962 |

FOREIGN PATENTS

| 219,675 | Australia | Feb. 6, 1958 |

OTHER REFERENCES

Nature, vol 176, pages 308 to 310, August 13, 1955.